US006581748B2

(12) United States Patent
Streibig et al.

(10) Patent No.: US 6,581,748 B2
(45) Date of Patent: Jun. 24, 2003

(54) SAFETY DEVICE FOR ESCALATORS OR MOVING WALKWAYS

(75) Inventors: Kurt Streibig, Vienna (AT); Norbert Frim, Vienna (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/158,431

(22) Filed: May 30, 2002

(65) Prior Publication Data

US 2002/0179402 A1 Dec. 5, 2002

(30) Foreign Application Priority Data

May 31, 2001 (EP) .......................................... 01810527

(51) Int. Cl.[7] .............................................. B65G 15/00
(52) U.S. Cl. ...................................................... 198/323
(58) Field of Search ................................ 198/321, 323, 198/326, 333

(56) References Cited

U.S. PATENT DOCUMENTS 5,810,147 A * 9/1998 Vanmoor .................... 198/323
6,129,197 A * 10/2000 Gore .......................... 198/323
6,131,719 A * 10/2000 Gore ...................... 198/323 X
6,152,279 A * 11/2000 Davis ..................... 198/323 X
6,405,847 B1 * 6/2002 Cook et al. ................. 198/323
6,425,472 B1 * 7/2002 Davis et al. ................ 198/323

FOREIGN PATENT DOCUMENTS

GB 2 343 668 A 5/2000

OTHER PUBLICATIONS

"Metro Using Brushes on Escalator Gap Problem". Stephen C. Fehr Washington Post, Sep. 9, 1994.*

* cited by examiner

*Primary Examiner*—James R. Bidwell
(74) *Attorney, Agent, or Firm*—Schweitzer Cornman Gross & Bondell LLP

(57) ABSTRACT

A deflector device prevents jamming of body parts and/or objects between a step belt, which consists of individual steps, and a balustrade pedestal of an escalator. A deflector profile member is fixedly connected with the pedestal plate. The deflector profile member has an opening which serves for the reception of a brush body carrying a brush. A first lug of the deflector profile member has a first projection and a second lug of the deflector profile member has a recess. A snap hook and a second projection are provided at the brush body, wherein the snap hook detents with the first projection and the second projection detents with the recess.

4 Claims, 4 Drawing Sheets

SAFETY DEVICE FOR ESCALATORS OR MOVING WALKWAYS

The invention relates to an escalator or a moving walkway consisting of a support, a step belt with steps or plate belt with belts for the transport of persons and/or articles and a balustrade, which is mounted by means of a balustrade pedestal, with a handrail, wherein a deflector device arranged at the balustrade pedestal prevents jamming of body parts and/or objects between the step belt, which consists of individual steps, and the balustrade pedestal.

BACKGROUND OF THE INVENTION

There has become known from U.S. Pat. No. 6,131,719 a safety device which prevents jamming between an escalator step belt, which consists of individual steps, and a pedestal plate. The safety device, conceived as a deflector, consists of a support profile member and brush elements. The support profile member, arranged at the balustrade pedestal, has at the step side a profiled opening into which the brush elements are insertable. A brush element consists of a brush body which grips the brush. The brush body is introduced at the front side (from the step side) into the profiled opening of the support profile member. After mounting of the brush element a wedge element is pushed from one end of the support profile member between the upper wall of the support profile member and the brush body, wherein the wedge element is firmly held by a rib of the brush body.

This safety device requires that the wedge element be pushed in a longitudinal direction into the support profile member for fixing the brush element provided as a deflector. Depending on the respective material strength of the support profile member and the brush body, this task can be laborious and involved due to the frictional forces to be overcome. When the deflector is contoured to accommodate a (radiussing) transition from the inclined part to the horizontal part of the escalator, additional frictional forces have to be overcome when the wedge element is pushed in.

BRIEF DESCRIPTION OF THE INVENTION

The purpose of the present invention is to overcome the deficiencies of the prior art and is directed to a safety device which can be mounted simply and quickly at the pedestal of the escalator.

In accordance with the purpose, the invention is a deflector device which comprises a profile member and a brush unit which is connected to the profile member by a snap connection.

The advantages achieved by the invention are substantially to be seen in that mounting of the brush unit is possible with little effort. If an exchange of the brush units is necessary, the old brush units can be removed by simple means and the new brush units mounted on the existing support profile member by snapping in and without use of tools. The need to divide the safety device into straight course parts and curved parts is superfluous. By virtue of the snap-in device according to the invention an endless deflector can be realised which is independent of directional changes predetermined by the course of the steps.

BRIEF DESCRIPTIONS OF THE DRAWINGS

The invention is explained in more detail in the following by reference to drawings illustrating embodiments, in which.

DETAILED DESCRIPTION OF THE INVENTION

Figure 1:
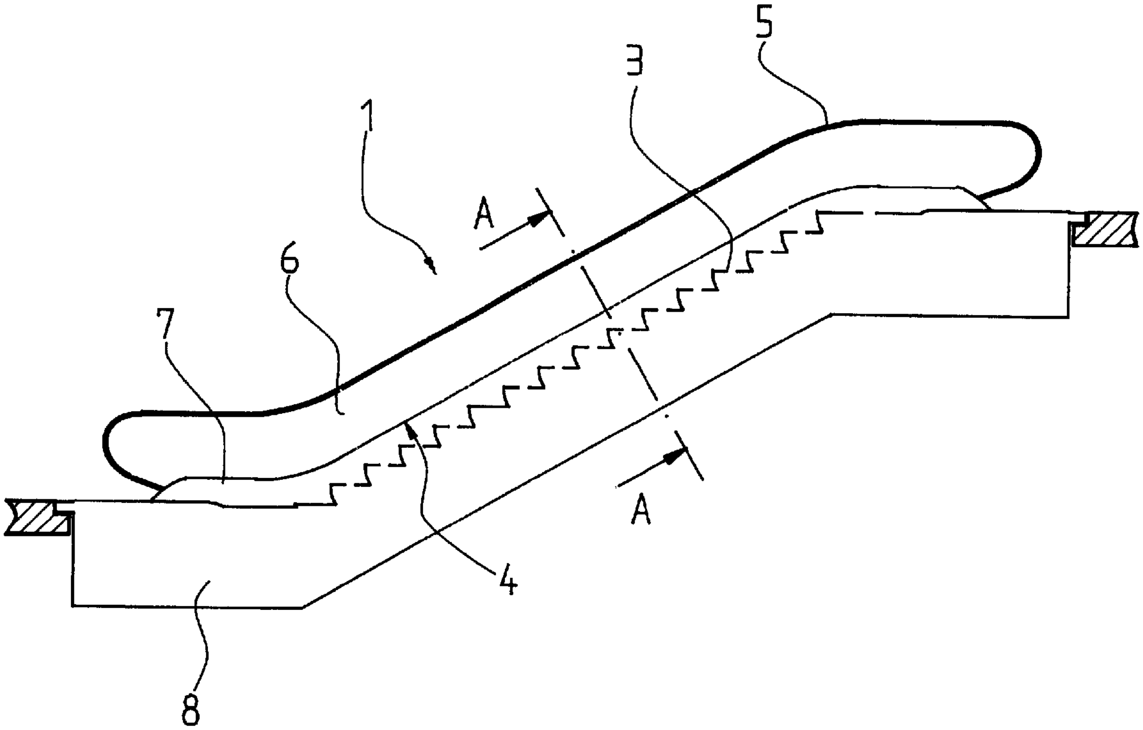
FIG. 1 is a diagrammatic side view of an escalator in which the invention is employed.

FIG. 1 shows an escalator 1 or a moving walkway which connects a first story with a second story, the escalator having a step belt 4 consisting of steps 3 (the moving walkway consisting of plates). A handrail 5 is arranged at a balustrade 6, which is mounted at its lower end by means of a balustrade pedestal 7. The balustrade pedestal 7 is carried by a support 8 of the escalator 1 or the moving walkway. In the further course of description there is used, instead of the term “escalator or moving walkway”, merely “escalator”, but the embodiments apply in an analogous manner to a moving walkway.

Figure 2:
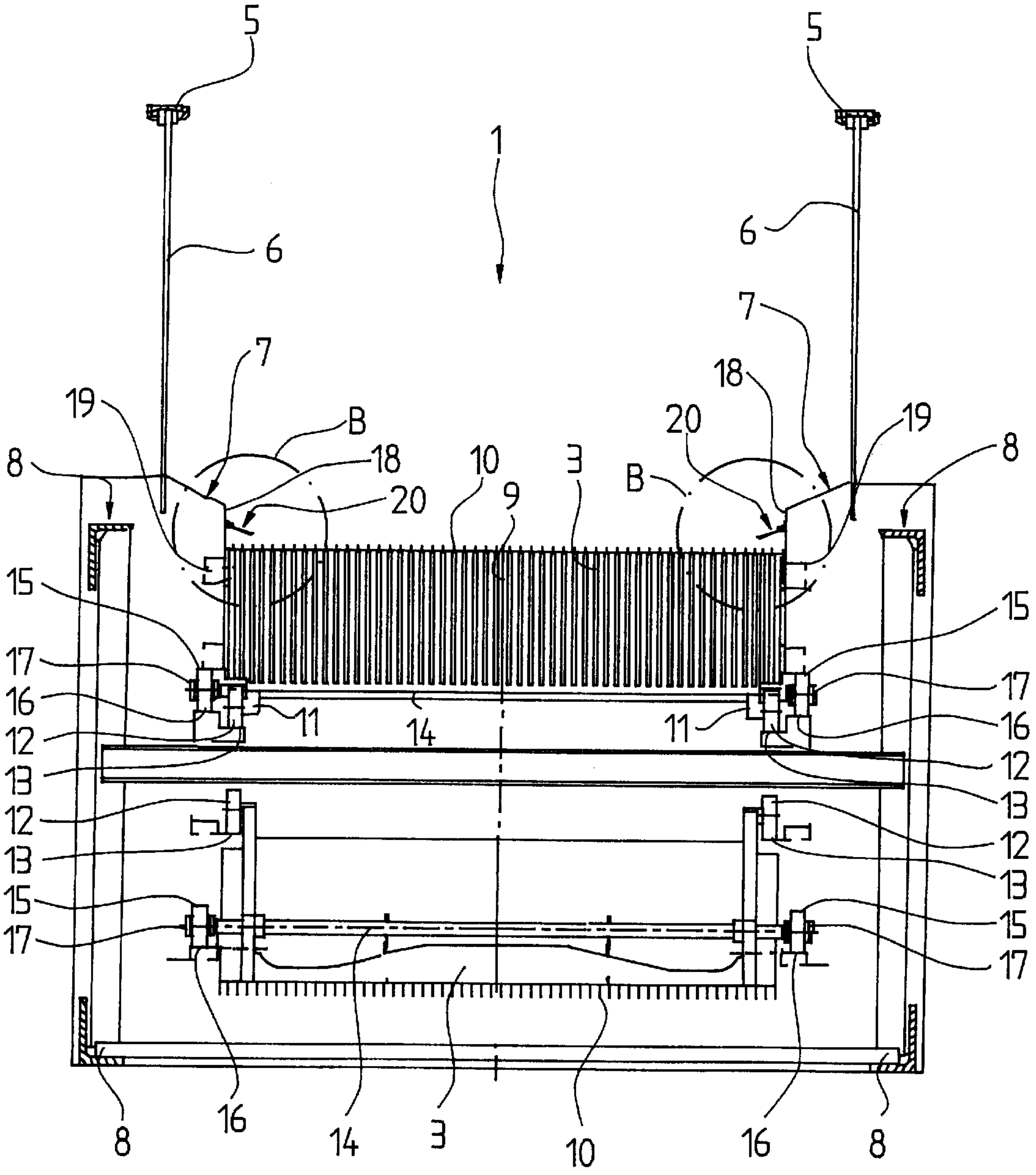
FIG. 2 is a section view, taken along the line A—A of FIG. 1.

FIG. 2 shows a section along the line A—A of FIG. 1. The upper riser part of the escalator 1 shows the forward run of the step belt 4. The steps 3 with a visible riser or end part 9 and tread surface 10 are upright and form a stairway. The lower part of the escalator 1 shows the return run of the step belt 4, wherein the tread surface 10 is directed downwardly. Step rollers arranged at arms 11 are guided by means of first guides 13 arranged at the support 8. Chain rollers 15 arranged on a step axle 14 are guided by means of second guides 16 arranged at the support 8, wherein each step axle 14 is connected with a drivable step chain 17. The balustrade pedestal 7 has, at the step side, a pedestal plate 18 which is provided at its rear side with a reinforcement 19, for example a U-shaped profile member. As a safety device there is provided a deflector device 20 which prevents jamming of body parts and/or objects between the edge of the step belt, which consists of the individual steps 3, and the pedestal plate 18.

Figure 3:
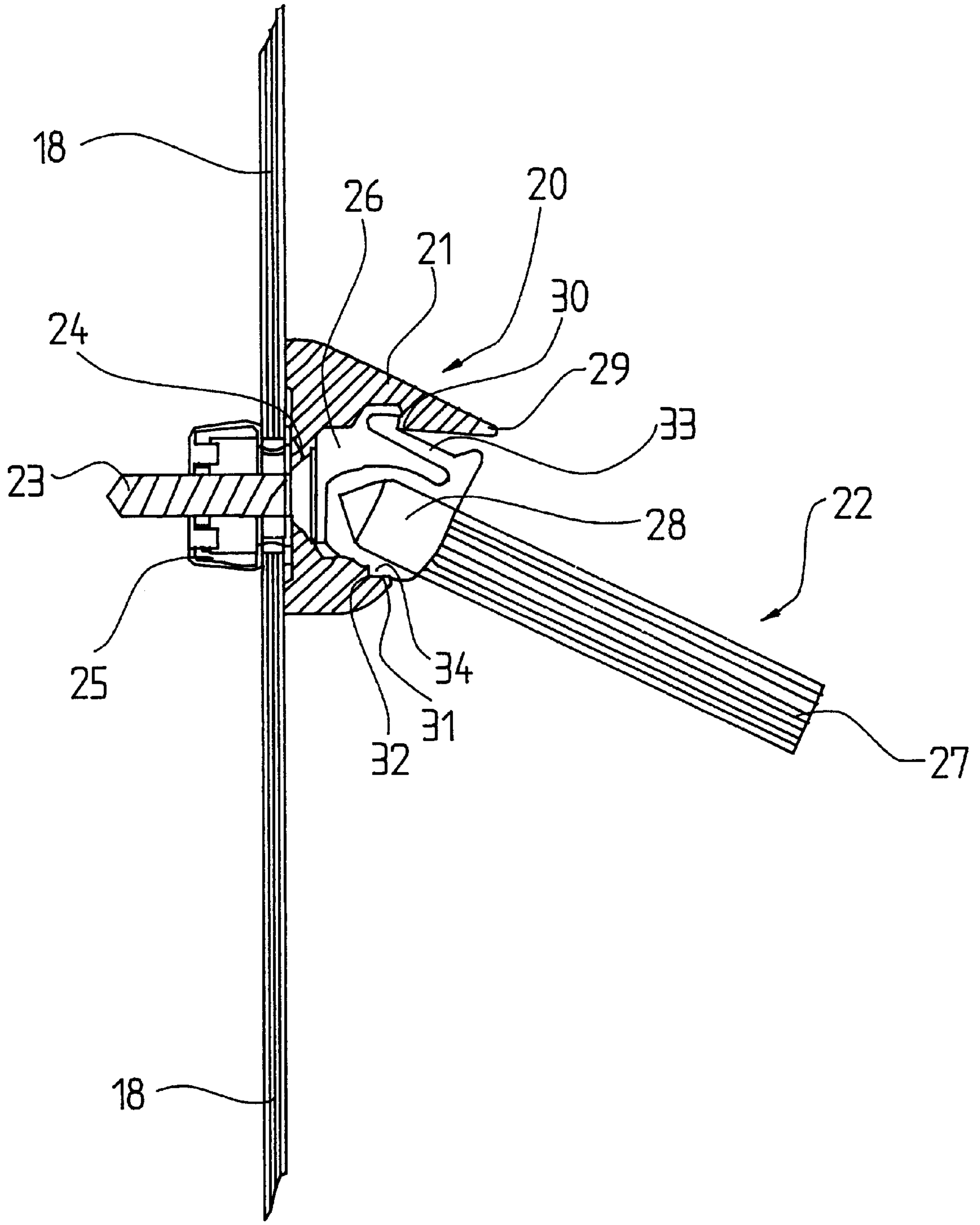
FIG. 3 is a detail elevation view at location B in FIG. 2 of the escalator showing the safety device according to the invention.

FIG. 3 shows the detail B of FIG. 2 with the deflector device 20 according to the invention, comprising of a deflector profile member 21 and a brush unit 22. The deflector profile member 21 is fixedly connected to the pedestal plate 18 by means of screws 23. A screw receptacle 24 of the deflector profile member 21 receives the head of the screw 23, wherein a cage nut 25 mounted to the pedestal plate 18 grips the screw 23. Screws 23 and cage nuts 25 are arranged along the step belt 4 at the pedestal plate 18 at specific spacings. The deflector profile member 21 has an opening 26 which serves for reception of a brush body 28 carrying a brush 27. A first lug 29 of the deflector profile member 21 has a first projection 30, and a second lug 31 of the deflector profile member 21 has a recess 32. A snap hook 33 and a second projection 34 are provided on the brush body 28, wherein the snap hook 33 detents with the first projection 30 and the second projection 34 detents with the recess 32. The snap hook 33 and second projection 34 may be formed continuously along the length of the brush body, or may be formed as a series of individual elements.

The deflector profile member 21 can be formed, for example, as an aluminium extrusion, and may be further formed into an endless loop. The brush unit 22, can, in accordance with need, be cut to length or mounted in a corresponding endless loop manner in the profile member.

The brush body 28 is inserted in the opening 26 so that the second projection 34 is received by the recess 32. The brush unit 22 is then rotated in a counter-clockwise sense about the recess 32 as an axis of rotation until the snap hook 33 detents with the first projection 30. For removal of the brush unit 22 the snap hook 33 is released from the first projection 30 by means of a tool and the brush unit 22 is rotated out in the clockwise sense.

Figure 4:
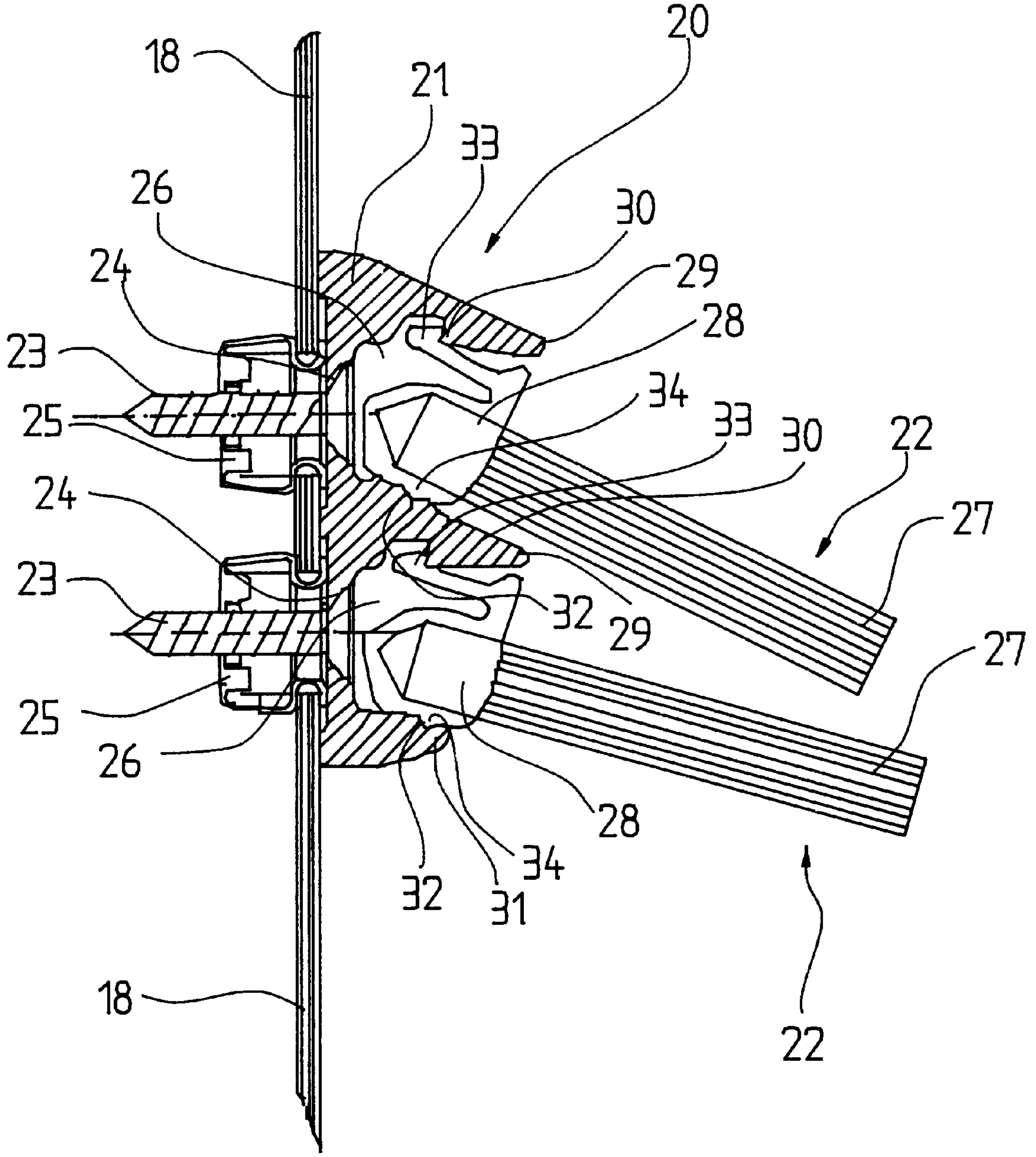
FIG. 4 is a detail elevation view at location B of the escalator showing an alternative embodiment of the invention.

FIG. 4 shows detail B of FIG. 2 with a second embodiment of deflector device 20 according to the invention, which comprises of a deflector profile member 21 with two openings 26 arranged one above the other, wherein the openings 26 are associated with each other at a specific angle. One of the brush units 22 inserted into one of the openings 26 is thereby oriented somewhat more steeply than the other brush unit 22 inserted into the other opening. The remaining construction of the deflector device 20 is comparable with that of FIG. 3, wherein a portion of a first lug 29 for the lower brush unit also serves as the second lug for the upper brush unit.

We claim:

1. A safety device for an escalator or moving walkway having a step belt with steps or a plate belt with plates for the transport of persons and/or articles and a balustrade which is mounted by means of a balustrade pedestal, the safety device being in the form of a deflector arranged at the balustrade pedestal to prevent the jamming of body parts and/or objects between the step belt or plate belt and balustrade pedestal, the safety device comprising a deflector profile member rigidly affixed to the balustrade pedestal, a brush unit supported by the profile member at a fixed orientation, and snap connection means for releasably connecting the brush unit to the profile member in the fixed orientation.

2. The safety device according to claim 1 wherein the deflector profile member has an opening for receipt of a brush body which carries a brush of the brush unit, the opening being bounded by lugs.

3. The safety device according to claim 1 or claim 2, wherein the snap connection means comprise a first projection at a first lug and a recess at a second lug of the profile member, and a snap hook on the brush body which detents with the first projection and a second projection on the brush body which is received in a non-detenting manner by the recess at the second lug.

4. A safety device for an escalator or moving walkway having a step belt with steps or a plate belt with plates for the transport of persons and/or articles and a balustrade which is mounted by means of a balustrade pedestal, the safety device being in the form of a deflector arranged at the balustrade pedestal to prevent the jamming of body parts and/or objects between the step belt or plate belt and balustrade pedestal, the safety device comprising a deflector profile member rigidly affixed to the balustrade pedestal, first and second brush units supported by the profile member at fixed orientations, and snap connection means for feleasably connecting the brush units to the profile member in the fixed orientations.

* * * * *